United States Patent [19]

Borchers et al.

[11] Patent Number: 5,760,349
[45] Date of Patent: Jun. 2, 1998

[54] ACOUSTIC ABSORBER HAVING A SLOTTED HORN ARRANGED IN A POT

[75] Inventors: Ingo U. Borchers, Uhldingen; Stephan T. Laemmlein, Markdorf; Peter Bartels, Immenstaad, all of Germany

[73] Assignee: Dornier GmbH, Friedrichshafen, Germany

[21] Appl. No.: 636,128

[22] Filed: Apr. 22, 1996

[30] Foreign Application Priority Data

Apr. 20, 1995 [CH] Switzerland ............ 01 129/95

[51] Int. Cl.⁶ ............................................. E04B 1/82
[52] U.S. Cl. ..................... 181/286; 181/288; 181/293
[58] Field of Search ........................... 181/213, 286, 181/288, 291, 292, 293

[56] References Cited

U.S. PATENT DOCUMENTS

| | | | |
|---|---|---|---|
| 1,783,276 | 12/1930 | Bliss | 181/292 |
| 3,174,580 | 3/1965 | Schulz et al. | 181/290 |
| 3,831,710 | 8/1974 | Wirt | 181/286 |
| 3,887,031 | 6/1975 | Wirt | 181/286 |
| 4,035,535 | 7/1977 | Taylor | 181/292 |
| 5,185,504 | 2/1993 | Jen | 181/286 |

FOREIGN PATENT DOCUMENTS

| | | |
|---|---|---|
| 0 421 887 | 4/1991 | European Pat. Off. . |
| 1 470 036 | 4/1977 | United Kingdom . |
| WO 92/00183 | 1/1992 | WIPO . |

*Primary Examiner*—Eddie C. Lee
*Attorney, Agent, or Firm*—Evenson, McKeown, Edwards & Lenahan, P.L.L.C.

[57] ABSTRACT

An acoustic absorber is made of a pot-shaped lower part with a pot bottom and side wall as well as an upper part having a horn. The horn projects into the bottom part and tapers in the direction of the pot bottom. Undesired noise is effectively reduced by the absorber. A relatively broadband, and at a given size, a relatively low-frequency absorption effect is achieved that is capable of protecting human hearing from injury or reducing the impact of noise such as on technical equipment and components.

19 Claims, 6 Drawing Sheets

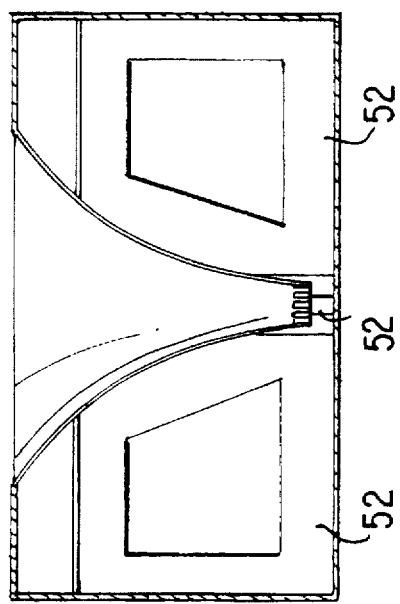
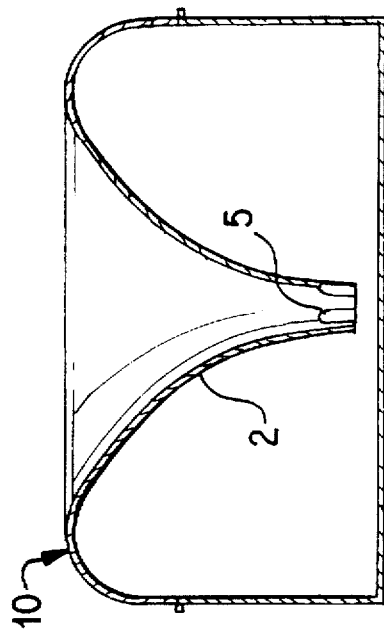
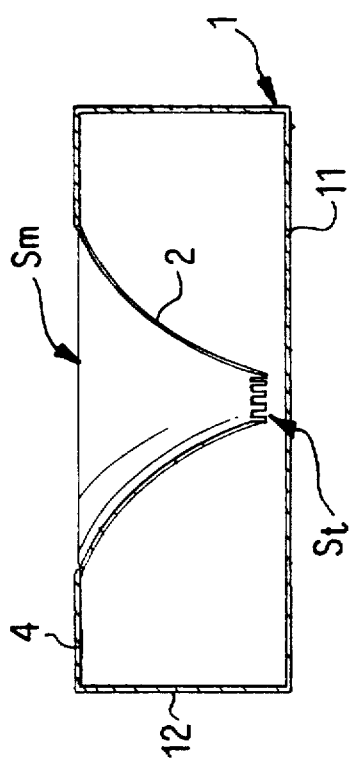
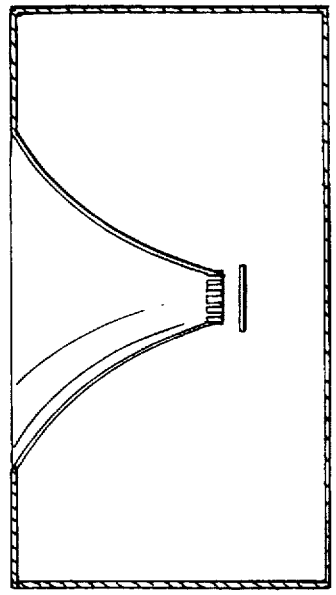

ACOUSTIC ABSORBER HAVING A SLOTTED HORN ARRANGED IN A POT

BACKGROUND AND SUMMARY OF THE INVENTION

The invention relates to an acoustic absorber for absorbing sound waves, especially sound waves in the low- and medium-frequency ranges.

Acoustic absorbers are intended for reducing undesired noise. This is done for various reasons, for example to protect the human ear against damage or to reduce the impact of noise. In technical equipment and parts, acoustic protection may be necessary to protect it from damage (noise fatigue). Noise fatigue can occur, for example, on aircraft landing flaps in the vicinity of engines, or at payload components of space launch systems as a result of the enormous noise generated at launch.

For physical reasons, conventional absorbers, for example the $\lambda/4$ absorber or acoustic damping materials (mats, foams) have height dimensions, at an optimum, of one-quarter of the wavelength of the noise to be reduced. The acoustic wavelength of a sound with f=100 Hz in ambient air is approximately $\lambda=3.4$ m. A $\lambda/4$ absorber tuned to this would have a height of L=0.85 m. Such large height dimensions are not practical because of other conditions (space, weight). In such cases it is necessary to make undesirable compromises or to eliminate acoustic absorption entirely.

The goal of the invention is to propose an acoustic absorber having a height or size that is much smaller than those of conventional absorbers, especially in the case of absorption of low and medium frequencies.

This goal is achieved by an acoustic absorber including a pot-shaped lower part having a pot bottom and side wall, and an upper part having a horn. The horn projects into the lower part and tapers in the direction of the pot bottom.

The absorber according to the invention includes a pot-shaped lower part with a pot bottom and side walls as well as an upper part having a horn, with the horn projecting into the lower part and tapering toward the pot bottom.

The directed oscillating fluid motion, i.e., the flow, of the impacting noise is concentrated by the horn. The flow then separates between the neck of the horn and the bottom of the pot, with the flow energy being dissipated.

A further conversion of the flow energy takes place at an optionally provided flow-permeable layer located in front of the mouth of the horn and thus posing a definite flow resistance to the fluid motion. This active principle then corresponds to that of a classical $\lambda/4$ absorber.

With this design of the absorber according to the invention, the known physical absorber principles of the Helmholtz resonator absorber (absorption at "lower frequencies") and the $\lambda/4$ absorber (absorption at "higher frequencies") are further developed and combined into one component.

The absorber according to the invention has a height much smaller than that of conventional absorbers. Sound absorption is effective not for just one frequency alone, but on a broadband basis for one frequency range or, when the permeable layer is present, several frequency ranges. This is especially true for absorption of medium and low frequencies.

By choosing the geometric parameters, the absorber can be tuned to the frequency range in which noise reduction is to be performed.

The effectiveness of the absorber according to the invention can be determined with conventional measuring equipment such as a Kundt tube or impedance tube for the normal incidence of sound or by reverberation time measurements such as the diffuse incidence of the sound.

The advantages gained with the invention consist in the fact that the absorption values determined by measurement cannot be achieved by any other known passive acoustic protection of comparable size and weight. An absorber of conventional design would require a larger volume and height for the same effect. The absorber according to the invention can be made very simply and requires little space. The noise reduction values that can be achieved by absorption and can be measured are of an order of magnitude suitable for protecting human hearing, perceptibly reducing the impact of noise, and significantly reducing the impact of noise on technical equipment and components.

In the preferred embodiment, the absorber according to the invention is essentially composed of three parts: a pot, a conical horn, and an additional permeable cover layer. The conical horn has its upper end resting flush on the pot and is covered by a permeable layer at its larger cross section, which faces the noise. The permeable cover layer has two purposes. The permeable cover layer ensures the physical effect of the $\lambda/4$ absorber component, and improves the absorption of the Helmholtz resonator absorber component for improved broadbandedness and lower resonant frequency.

The horn tapers toward the bottom of the pot and is located at a specified distance from the bottom. The horn also has a specific cross-sectional area (diameter). In the vicinity of the smaller cross section, crown-shaped recesses, hereinafter referred to as slots, can advantageously be machined into the wall of the horn.

Possible applications of the invention can be found in all technical fields in which low-frequency sound absorption cannot be handled by conventional means, for reasons that include, for example, available volume, cost, weight, hygiene, decorative design, and sturdiness. Specific applications include aircraft (internal noise), motor vehicles (internal and external noise), and rail vehicles (internal and external noise).

Other objects, advantages and novel features of the present invention will become apparent from the following detailed description of the invention when considered in conjunction with the accompanying drawings.

BRIEF DESCRIPTION OF THE DRAWINGS

FIGS. 5A–5D illustrate various additional embodiments of the present invention;

DETAILED DESCRIPTION OF THE DRAWINGS

Figure 1:
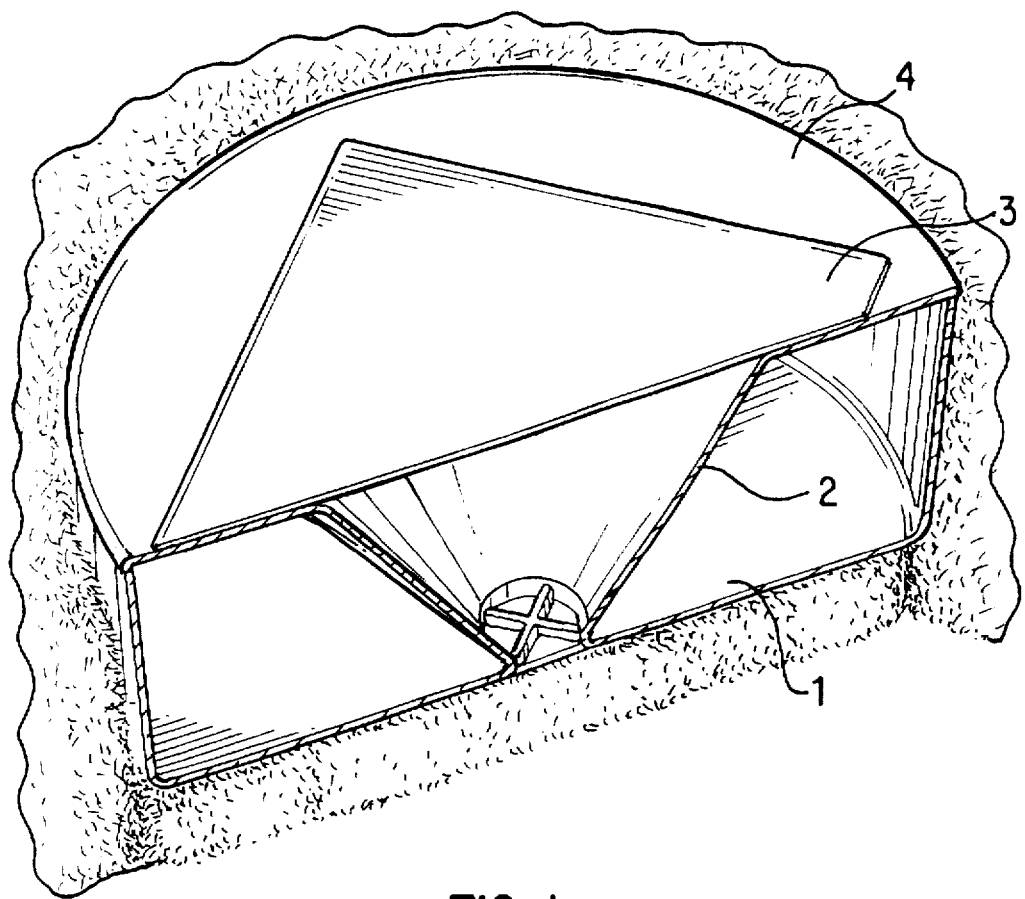
FIG. 1 is a photograph of a section through an absorber according to the invention, with a permeable cover layer.

The embodiment in FIG. 1 is made of thin-walled polystyrene for weight reasons (wall thickness approximately 1 mm). The elements are pot 1, horn 2, permeable cover layer 3, and diaphragm 4. A cruciform spacer is located between the horn and the bottom of the pot.

The individual elements are connected to one another by gluing. In this example, the absorber is embedded in foam for mounting the absorber on a wall. Another mounting method would be by direct gluing of the absorber to the wall, for example.

The horn 2 tapers conically from an opening with a larger diameter (this part of the horn will be referred to in the following as the mouth of the horn), through which the sound enters, to an opening with a smaller diameter (this part of the horn will be referred to in the following as the neck of the horn). Permeable cover layer 3 is located above the mouth of the horn. Permeable cover layer 3 improves the broadband nature of the absorption effect. It is not absolutely necessary in certain applications, however.

Figure 2:
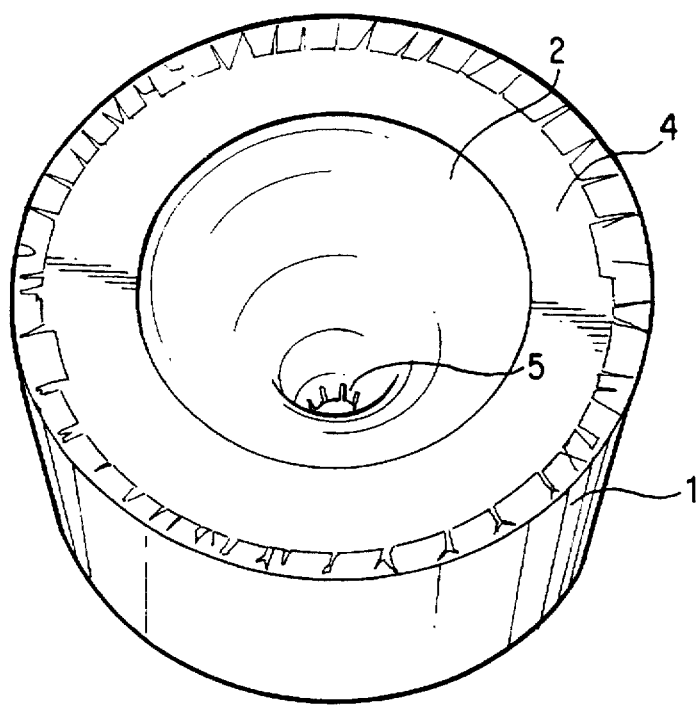
FIG. 2 is a photograph of an absorber according to the invention, without a permeable cover layer.

FIG. 2 shows an embodiment without a permeable cover layer. In this embodiment, pot 1 and an optional diaphragm 4 connecting the horn 2 with the pot 1 are made of aluminum (wall thickness about 5 mm). The horn 2 itself is made of fiberglass-reinforced plastic using a positive design. Slots 5 are provided on the circumference, in the vicinity of the pot bottom or neck, on the tapered cross section of the horn.

Basically cylindrical shapes having cross sections that are round, oval, or polygonal for example may be used as geometric basic shapes for the absorber pot 1. Funnel-shaped shells with a straight (corresponding to a cone), hyperbolic, or circular wall shape can be used in particular as horn shapes. For manufacturing reasons, rotationally symmetrical horn shapes are advantageous. However, the advantages according to the present invention can also be achieved using asymmetric horn shapes.

Figure 3:
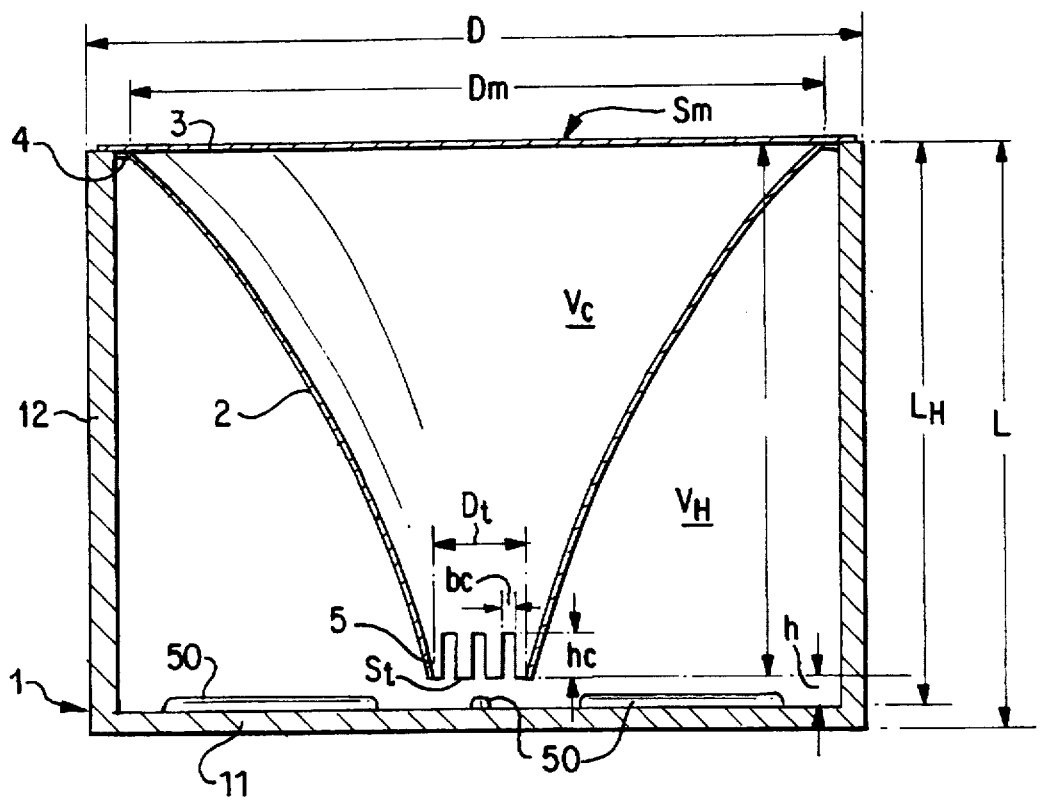
FIG. 3 is a schematic cross-section through an absorber according to the invention, with the essential geometric markings.
Figure 4:
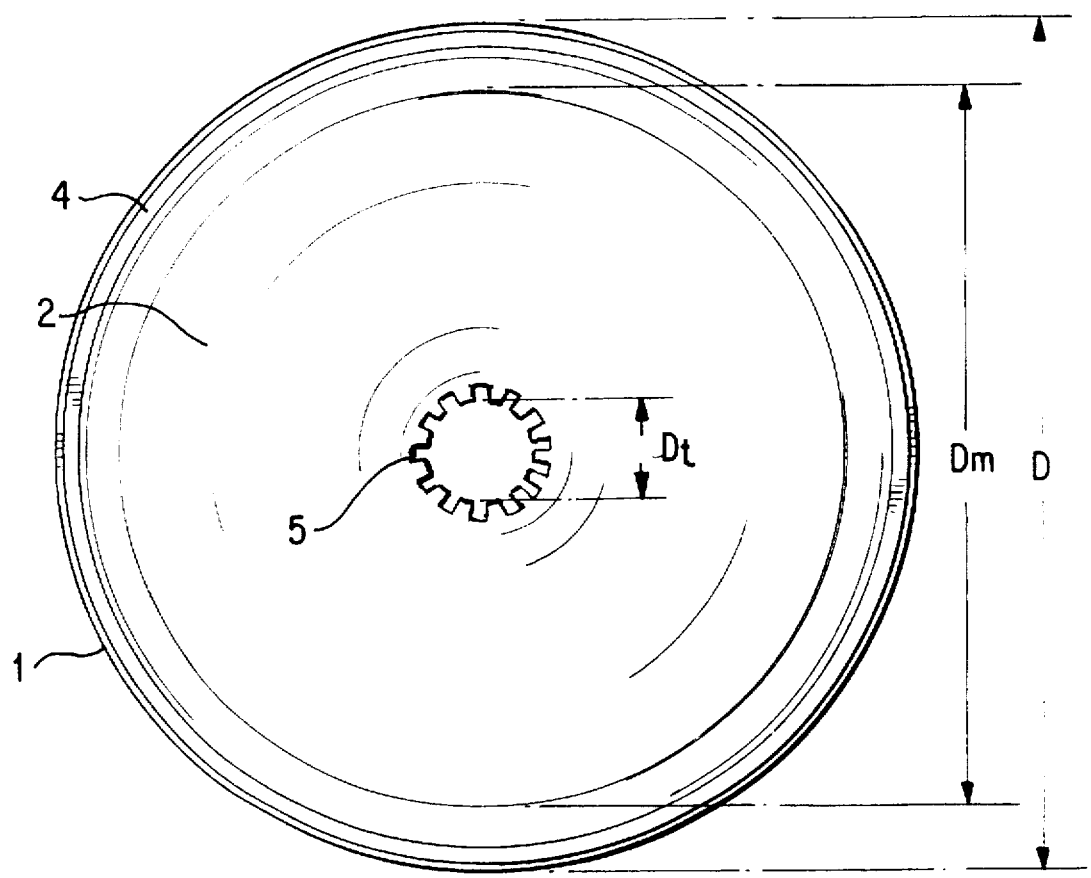
FIG. 4 is a schematic top view of the absorber according to the invention.

In FIGS. 3 and 4, the important features of the absorber according to the invention are shown in the form of a schematic sketch. The pot-shaped bottom part 1 of the pot bottom 11 and the side walls 12 are supported by the horn 2, while the flow-permeable layer 3 is located above the horn mouth $S_m$.

The sound enters through horn mouth $S_m$. The directed oscillating flow of the incident sound is concentrated by the horn, and flow separation takes place between the neck of the horn and the bottom of the pot, with the flow energy being dissipated.

The rigidities of the two components, i.e., the horn 2 and the pot 1, are made such that the first natural frequencies of the structure are located considerably above the maximum acoustic absorption, i.e. at least approximately 50% above this value. The choice of materials and wall thicknesses for the components must therefore be made such that the above rigidity condition is met. Basically, metals that are easily worked (steel and aluminum, for example), plastics (polystyrene, polycarbonate, and fiber-reinforced plastics for example), wood, or minerals are suitable as material choices. The pot can be made more rigid by ribs or beads 50 in order to meet the stiffness requirements. Similarly, ribs 52 (see FIG 5B) that provide a direct connection between the walls of the horn and pot can be provided to achieve the desired stiffness.

For manufacturing reasons, the pot can be assembled from a plurality of elements such as a bottom disk and a housing ring. The diaphragm 4 can be located between the horn 2 and the housing ring. The diaphragm 4 then has the primary purpose of creating a solid connection between the pot 1 and the horn 2 in the event that the larger opening $S_m$ of the horn with diameter $D_m$ (noise-collecting cross section) is much smaller than the pot cross section with diameter D. Alternatively, the horn can also be pulled in one piece all the way out to the edge of the pot to produce a suitable connection.

The pot-shaped lower part 1 and the upper part abut one another in a sound-tight manner.

Advantageously, the horn 2 has slots (cutouts) 5 in tapered opening $S_r$. In this embodiment, the slots 5 are regularly distributed around the circumference and extend perpendicularly to the edge of the horn 2. The result is a crown-shaped end on the horn. The number, height $h_c$, and width $b_c$ of the slots 5 depend on the frequency range for which the absorber is designed. The slots 5 improve the absorption effect but can also be omitted entirely. Another significant advantage of the slots in the vicinity of the neck of the horn is the fact that much broader manufacturing tolerances are allowable for the distance h from the horn neck to the pot bottom than if the slots are omitted.

A number of variations are possible for locating the slots 5. Thus, the slots can also be distributed nonuniformly around the circumference, for example. The width, height, and/or shape of the slots can be made different on the same horn.

The pot part is preferably produced by deep drawing, stamping, or turning (metal), or by the injection-molding or deep-drawing process (plastic). The horn part is likewise preferably made by deep drawing, stamping, or turning (metal), or by injection molding or deep drawing (plastic). Manufacture using fiber-reinforced bonding AFRP, Aramid-fiber-reinforced plastic, CFRP, carbon-fiber-reinforced plastic, and GFRP, fiberglass-reinforced plastic) using the hand lay-up method on cores is equally suitable.

The permeable cover layer 3 must cover the mouth of the horn (area $S_m$) completely. Materials that exhibit certain flow resistances that are on the order of magnitude R=ρc (ρ: gas density, c: speed of sound in the sound-conducting medium) are used for this purpose. An experimental design of the flow permeability or porosity of the permeable layer for the purpose of absorption optimization can be developed. The following are preferably used as materials for the cover layer: metal ("felt metal"), plastic (porous thin-walled GFRP plates), or porous fiber layers. For the purpose of simplifying construction and in special applications, for example at high noise levels of OASPL larger than 130 dB, or in order to achieve a more narrow-band effect, the permeable cover layer can be omitted completely.

FIGS. 5A–5D show a variety of other embodiments of the absorber described above. All of the embodiments have in common, a pot-shaped lower part 1 with a pot bottom 11 and a side wall 12, the horn part that extends to a point close to the bottom of the pot, and an optional permeable cover layer. The two upper designs (FIGS. 5A and 5B) as well as the design shown at the lower left (FIG. 5C) each have a diaphragm 4 connecting the vicinity of the horn mouth $S_m$ with the upper edge of the pot 1. In the example at the lower right (FIG. 5D), the horn 2 makes a transition by means of a bead 10 having an arcuate cross section, into the wall of the pot 1.

Instead of the horn neck $S_r$ being brought down to a point close to the bottom of the pot, it is also possible to provide an impact plate as sketched in the embodiment in FIG. 5C.

The embodiments shown also differ in the aperture angle of the horn and slot 5 on the neck of the horn. In FIG. 5D, for example, the slot width $b_c$. (FIG. 3) is relatively large and the upper edge of the slot is made arcuate.

In one example of an application (FIGS. 6A–6D), the absorber A according to the invention is used for noise encapsulation of a transmission. The transmission generates undesired noise at approximately OASPL=100 dB, especially in the frequency range f=200 Hz. The noise, radiated outward, must be reduced by a sound-absorbent shroud that is as compact and light as possible. As shown in FIG. 6D, for this purpose the absorber A is provided as continuously as possible on the inside of the sound-absorbent shroud. The mouth of the horn faces the noise generator, i.e., the transmission shown schematically.

Figure 6A:
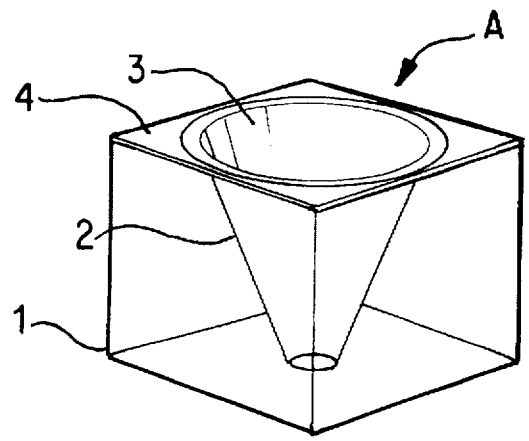
FIGS. 6A–6D show the use of the absorber according to the invention for a soundproofing shroud.
Figure 6B:
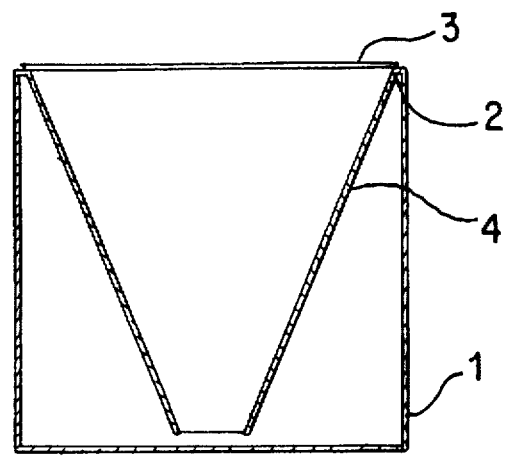
Figure 6C:
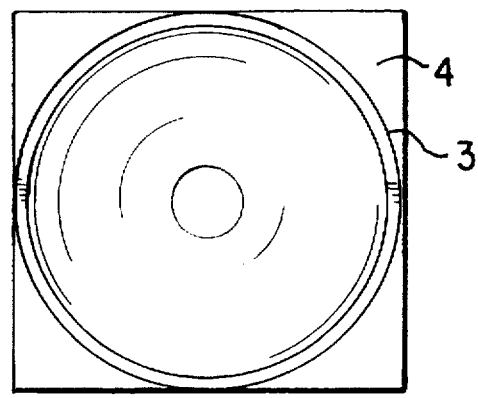
Figure 6D:
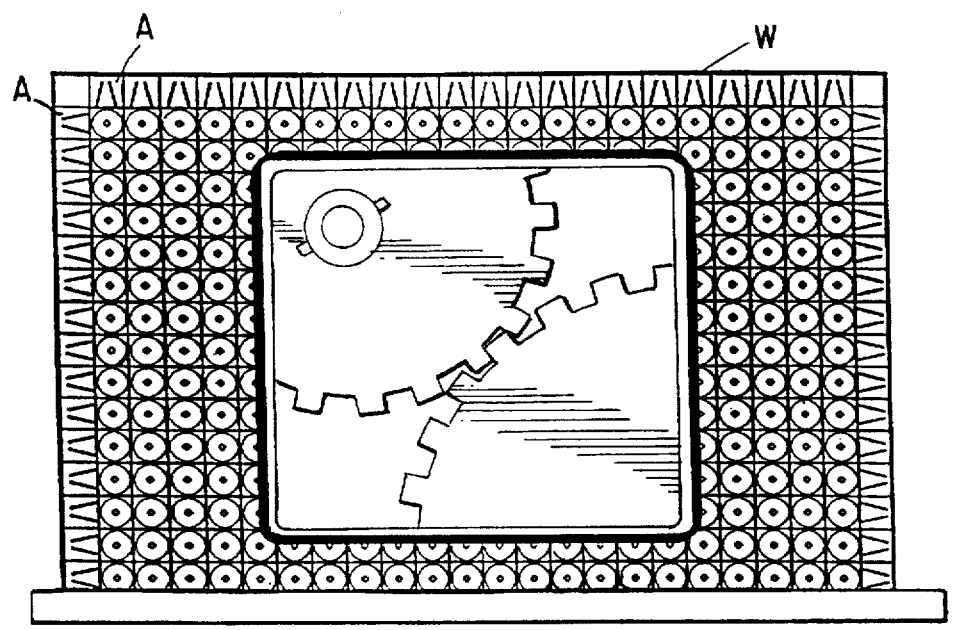

The absorber A used here is shown in three views in FIGS. 6A–6C. In this specific embodiment designed for damping noise in the frequency range around 200 Hz, acoustic absorber A has a total height of L=103 mm. To simplify the design, the horn 2 of the absorber is made conical (straight conical shape of horn wall). The diameter of the horn mouth is $D_m$=93 mm and the neck of the horn has a diameter $D_f$=19 mm. For the sake of simplicity, it is not shown crown-shaped but with sharp edges. The length of the horn is l=98 mm. The distance from the neck of the horn to the bottom of the pot is set at h=4 mm.

To cover the rectangular wall W of the sound-absorbent shroud, the absorber pot 1 is designed with a square bottom outline, with side length X=100 mm, to cover the entire surface as continuously as possible. As a result, the absorber pot takes on a roughly cubic appearance. The connection between the horn 2 and the pot 1 is provided by a diaphragm 4, with the diaphragm and horn being integrated into one part. Pot 1 and horn 2 with diaphragm 4 are made by injection molding from polystyrene, with a wall thickness of approximately d=1 mm. The two parts are connected by a plastic adhesive suitable for use with polystyrene.

The mouth of the horn is covered by a flow-permeable layer made of GFRP. To achieve a desired porosity or permeability of approximately R=1000 kgm$^{-2}$s$^{-1}$, the single-layer GFRP fabric is saturated with as little resin as possible and is dried before curing with an absorbent fleece, using a vacuum. The circular GFRP layer with a thickness of approximately 0.33 mm and a diameter of about 98 mm is glued to the mouth of the horn using a plastic adhesive.

Figure 7A:
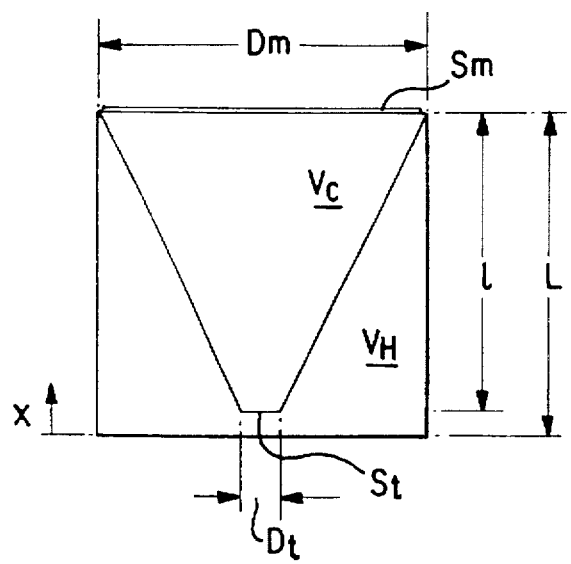
FIGS. 7A–7B are sketches showing the derivation of the resonant frequency of the absorber according to the invention.
Figure 7B:
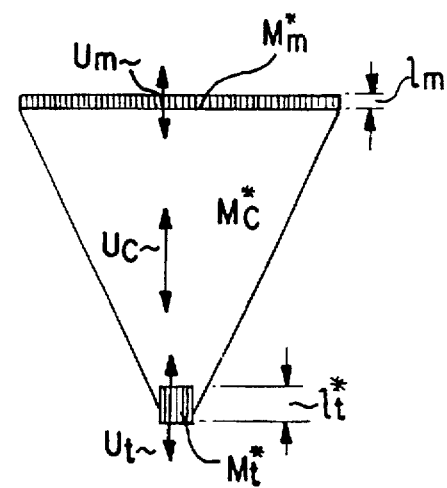

With reference to FIGS. 7A and 7B, the resonant frequency of the absorber according to the invention will now be derived approximately, using the design with a permeable layer on the mouth of the horn. On the left (FIG. 7A), in a schematic representation, an absorber according to the invention is shown, and on the right (FIG. 7B), the corresponding mechanical equivalent circuit diagram of the oscillating fluid motion is shown.

As mentioned above, the absorber according to the invention is a combination of the principle of the λ/4 absorber (absorption at "higher frequencies") and the Helmholtz resonator absorber (absorption at "lower frequencies"). Various acoustic elements such as the permeable layer, horn volume, slots, and cell volume are linked to one another.

The reflection volume of the λ/4 absorber in the absorber according to the invention occurs again in the horn volume $V_c$. The distance of the permeable layer from the bottom is constant only in the range of $S_f$ and otherwise varies depending on the horn contour. As a result, the frequency of best absorption is spread over a broader frequency range.

For the λ/4 absorber component, a resonant frequency of $$f_{0\lambda/4} = \frac{c}{4h}$$

at which the maximum absorption occurs is known from various textbooks. Here the values of c are the speed of sound in the sound-conducting medium and h is the distance of the permeable layer from the solid bottom. In this case, a maximum for the particle velocity occurs at the permeable layer, with acoustic flow energy being converted into vorticity at the permeable layer, so that noise absorption occurs. In the case of the absorber according to the invention, height h firstly corresponds to distance L in FIG. 7A and, secondly, to the variable distance (L-x) associated with the contour of the horn.

In the case of the Helmholtz resonator absorber element of the absorber according to the invention, the slot area described in textbooks is found in the vicinity of the horn neck. The horn volume itself increases the percentage of sluggish, effectively oscillating fluid mass, by which the resonant frequency is displaced toward lower values.

This effect is additionally increased by the presence of the permeable layer. In addition, by virtue of the shape of the horn, the speed of the pulsating fluid increases at the neck of the horn. The flow separates at the slot and at the crown, so that the flow energy is dissipated into heat. This involves a loss of acoustic energy, so that an absorption effect occurs.

The resonant frequency of the Helmholtz resonator absorber can be derived from the formula of a spring mass oscillator as is known from textbooks by the equation:

$$f_0 = \frac{1}{2\pi} \sqrt{\frac{S}{m}} \qquad \text{Eq. 1}$$

Here S is the spring stiffness and m is the size of the oscillating mass. In the case of the Helmholtz resonator, stiffness S corresponds to a "stiffness of the resonator volume" with the value $$S = \frac{\rho c^2 S_s^2}{V_H} . \qquad \text{Eq. 2}$$

The effectively oscillating mass m=m* is given by $$m^* = \rho S_s l^*, \qquad \text{Eq. 3}$$

where l* indicates the effective height of the oscillating air column.

If we add Equations 2 and 3 to Equation 1, we obtain the classical formula for the resonant frequency of the Helmholtz absorber.

$$f_{0H} = \frac{c}{2\pi} \sqrt{\frac{S_s}{V_H l^*}} , \qquad \text{Eq. 4}$$

When used for the geometry of the absorber according to the invention, the calculation of l* and m* acquires particular significance (FIG. 7.)

The oscillating air column is composed of the three components: horn mouth, horn cone, and horn neck. If we place these relative to the cross-sectional area $S_f$, we can then say:

$$l^* = l^*_m + l^*_c + l^*_f, \qquad \text{Eq. 5}$$

$$m^* = S_s l^* \qquad \text{Eq. 6}$$

Here $l^*_f$ and $l^*_m$ can be determined empirically. For the component $l^*_c$ that represents the horn, the following continuity relationship can be created, assuming that all the fluid particles in the horn are oscillating in phase ("oscillating column"):

$$u_r S_f = u_x S_x = u_m S_m \qquad \text{Eq. 7}$$

The kinetic energy of an oscillating continuum is given by $$E_{kinc} = \frac{\rho}{2} \int_{L-1}^{L} S_x u_x^2 dx \approx \frac{1}{2} \rho \, l^* _c S_t u_t^2.$$ Eq. 8

With the simplifying assumption of a conical horn shape (straight-line horn contour)

$$S_x = S_t \left( \frac{x}{(L-l)} \right)^2$$ Eq. 9 and $$u_x^2 = u_t^2 \left( \frac{S_t}{S_x} \right)^2,$$ Eq. 10 we obtain from Equation 8

$$l^*_c = \frac{L-l}{L} l = \frac{D_l}{D_m} l$$ Eq. 11

Thus, we obtain by way of approximation, as the resonant frequency of the Helmholtz resonator component of the absorber according to the invention, from Equation 4:

$$f_0 = \frac{c}{2\pi} \sqrt{\frac{S_t}{V_H \left( l^*_m + \frac{D_l}{D_m} l + l^*_t \right)}}$$ Eq. 12

Equation 12 constitutes an initial estimate of the resonant frequency and is therefore an important starting point for a first attempt at determining the size of the absorber. Here, the values for $l^*_m$ and $l^*_t$ can be determined from geometrically similar absorbers by scaling. The empirically determined resonant frequencies in the embodiments can differ 10–25% from this value. Defining the resonant frequency provides no information about the degree of absorption to be expected at this frequency. Such a prediction can only be made experimentally. The influence of the size and shape of the slots, the influence of the permeability of the permeable layer, and the magnitude of the incoming noise level also play an important role.

TABLE OF REFERENCE NUMBERS

| | |
|---|---|
| 1 | Pot |
| 2 | Horn |
| 3 | Permeable layer |
| 4 | Diaphragm |
| 5 | Slot |
| 10 | Arcuate bead |
| 11 | Pot bottom |
| 12 | Pot wall |
| A | Absorber |
| $b_c$ | Slot width |
| D | Total diameter of absorber |
| c | Speed of sound |
| $D_m$ | Diameter at point where noise enters (horn mouth) |
| $D_l$ | Diameter of horn neck |
| f | Frequency |
| h | Distance between horn and pot bottom |
| $h_c$ | Slot height |
| l | Height of horn |
| L | Total height of absorber |
| $L_H$ | Height of Helmholtz resonator volume |
| $S_m$ | Cross-sectional area of horn mouth |
| $S_t$ | Cross-sectional area of horn neck |
| $V_c$ | Horn volume (volume of cone) |
| $V_H$ | Helmholtz resonator volume (cell volume) |
| W | Wall of sound-absorbent shroud |
| X | Local distance from pot bottom |

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An acoustic absorber, comprising
   a pot having a pot-shaped lower part with a pot bottom, and a side wall; and
   a horn arranged in said pot, said horn projecting into the pot-shaped lower part and tapering in a direction toward the pot bottoms;
   slots provided in a wall of the horn in a vicinity of a narrower tapered open end of the horn, said narrower tapered open end of the horn being located at a predetermined distance from said pot bottom.

2. The acoustic absorber according to claim 1, wherein said horn tapers from a mouth opening having a larger diameter to a neck opening having a smaller diameter.

3. The acoustic absorber according to claim 2, wherein the neck opening of the horn projects into the pot-shaped lower part.

4. The acoustic absorber according to claim 1, wherein said horn has a rotationally symmetric shape.

5. The acoustic absorber according to claim 1, wherein a wall of said horn has a taper which is one of a straight-line, hyperbolic, and circular shape.

6. The acoustic absorber according to claim 1, wherein said slots have an arcuate-shaped upper edge.

7. The acoustic absorber according to claim 1, further comprising an impact plate located between the narrower tapered open end of the horn and the pot bottom.

8. The acoustic absorber according to claim 1, wherein the side wall of the pot-shaped lower part is perpendicular to the pot bottom.

9. The acoustic absorber according to claim 1, wherein said pot-shaped lower part has one of a circular, oval, and polygonal cross-section.

10. The acoustic absorber according to claim 1, further comprising a flow-permeable layer provided at a mouth opening of the horn having a larger diameter than a neck opening of the horn.

11. The acoustic absorber according to claim 10, wherein said flow-permeable layer is formed of one of metal, plastic, and porous fiber layers.

12. The acoustic absorber according to claim 1, wherein the side wall and the pot-shaped lower part abut one another in a sound-tight manner.

13. The acoustic absorber according to claim 1, wherein the side wall includes a diaphragm connected flush with the horn.

14. The acoustic absorber according to claim 1, wherein a mouth opening of the horn transitions via a bead into the side wall of the pot.

15. The acoustic absorber according to claim 1, further comprising one of ribs and beads arranged on the pot-shaped lower part for stiffening the acoustic absorber.

16. The acoustic absorber according to claim 1, further comprising ribs arranged between the side wall of the pot-shaped lower part and a wall of the horn for stiffening the acoustic absorber.

17. The acoustic absorber according to claim 1, wherein each of said slots opens at one end at said pot bottom.

18. A sound-absorbent shroud, comprising:
   a shroud having an inner surface and an outer surface, said inner surface being arrangeable to face a noise generating source;

a plurality of acoustic absorbers arranged continuously on said inner surface of said shroud so as to face the noise generating source when in use;

each of said plurality of acoustic absorbers comprising a pot having a pot-shaped lower part with a pot bottom and a side wall, and a horn arranged in said pot, said horn projecting into the pot-shaped lower part and tapering in a direction toward the pot bottom, and slots provided in a wall of the horn in a vicinity of a narrower tapered open end of the horn, said narrower tapered open end of the horn being located at a predetermined distance from said pot bottom.

19. The acoustic absorber according to claim 18, wherein each of said slots opens at one end at said pot bottom.

* * * * *